June 4, 1929.  M. J. HUGGINS  1,715,502
MOUNTING FOR INDICATING INSTRUMENTS
Filed Jan. 27, 1925  2 Sheets-Sheet 1
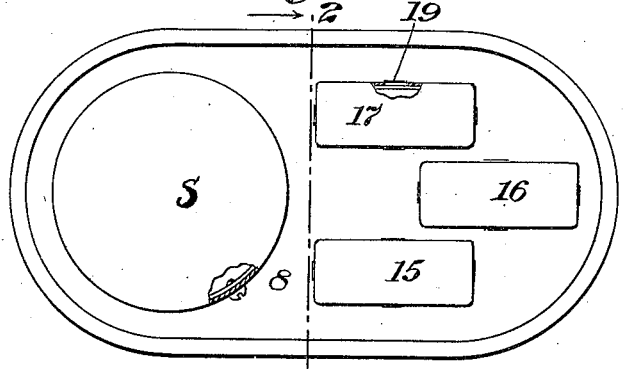
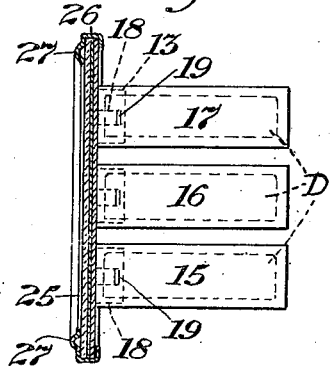
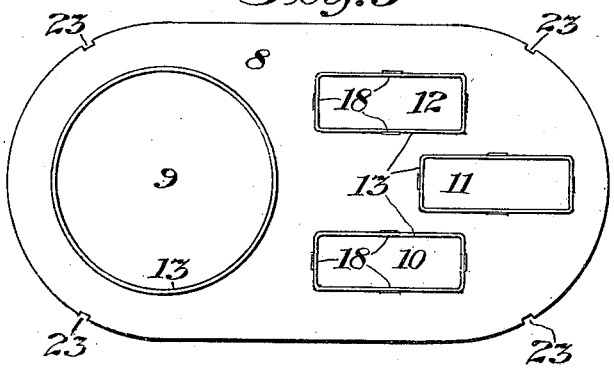
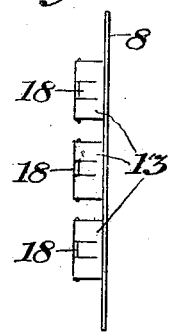
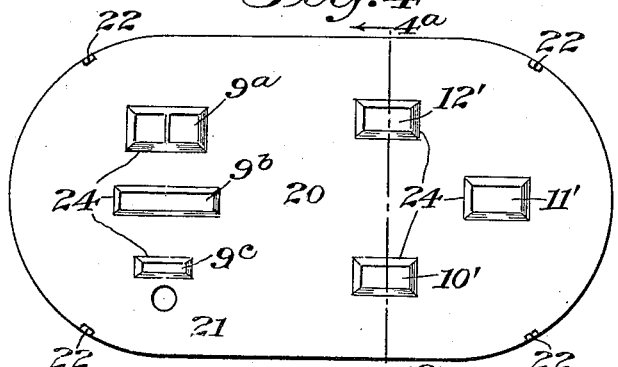
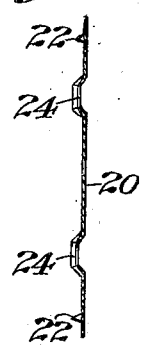
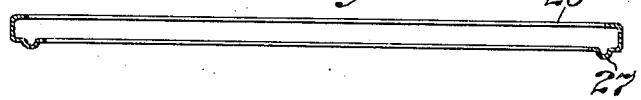
INVENTOR
Merion J. Huggins
BY
HIS ATTORNEY June 4, 1929.  M. J. HUGGINS  1,715,502
MOUNTING FOR INDICATING INSTRUMENTS
Filed Jan. 27, 1925  2 Sheets-Sheet 2
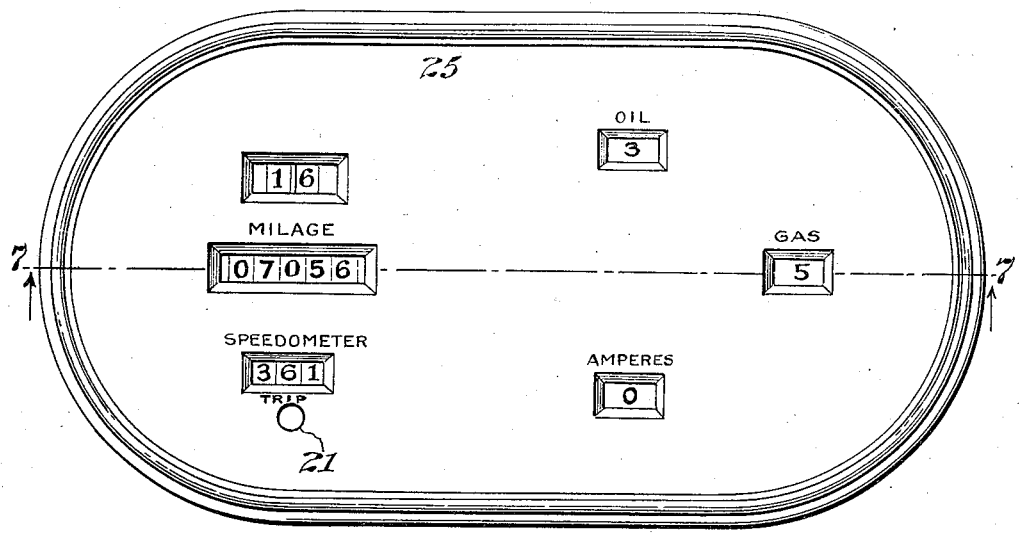
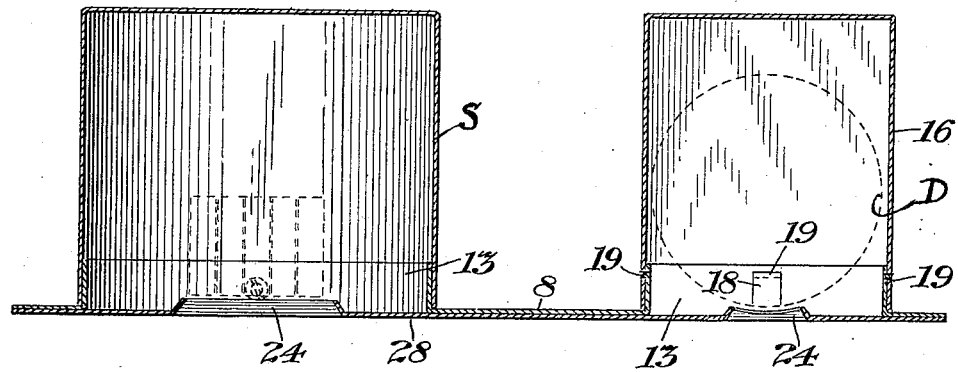
INVENTOR
Merion J. Huggins
BY
HIS ATTORNEY Patented June 4, 1929.

1,715,502

UNITED STATES PATENT OFFICE.

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE.

MOUNTING FOR INDICATING INSTRUMENTS.

Application filed January 27, 1925. Serial No. 5,111.

This invention relates to indicating instruments, and it is the object of the invention to provide an improved mounting for indicating instruments and a dial for such instruments to provide a simplified unitary structure to facilitate the supporting of the instruments, the same being particularly adapted for the mounting of the indicating instruments on the instrument board of motor vehicles.

In motor vehicles it is the universal practice to mount different indicating instruments, such as a speedometer, oil pressure gauge, ammeter and other indicating instruments separately upon the instrument board of the vehicle, and it is a further object of the invention to provide a unitary mounting and indicating dial for a plurality of indicating instruments to not only facilitate the mounting of the instruments but also the ready reading of the same.

It is a further object of the invention to provide a mounting for a plurality of indicating instruments wherein a dial is common to a plurality of indicating instruments, and to provide improved means for releasably connecting and supporting the instruments from the mounting in relation to the dial whereby one instrument may be readily substituted for another instrument without the necessity of taking down the instrument mounting from its support.

Another object of the invention is to provide a mounting for indicating instruments wherein the indicator means of the instrument comprises a pivotally or rotatably graduated or calibrated dial or wheel and the calibrations to be exposed through a window in the dial said window being arranged to co-operate with the dial to serve as an indicator.

Other objects and advantages will hereinafter appear.

In the drawings accompanying and forming a part of this specification I have shown an embodiment of the invention wherein Figure 1 is a view looking at the rear of my improved indicator instrument mounting, the casings of certain of the instruments being broken away to show the connection of the instruments to the mounting.

Figure 2 is a cross sectional view taken on the line 2—2 of Figure looking in the direction of the arrows.

Figure 3 is a view looking at the rear of a mounting plate forming a part of the instrument mounting.

Figure 3ª is a view looking at the end of Figure 3.

Figure 4 is a view of a dial looking at the rear thereof constituting a part of the mounting.

Figure 4ª is a cross sectional view taken on the line 4ª—4ª of Figure 4 looking in the direction of the arrows.

Figure 5 is a cross sectional view of a bezel or frame for combining and locking the dial and mounting plate as well as a transparent face for the dial in contiguous relation to form a dust tight closure for the dial openings and the instruments attached to the mounting plate.

Figure 6 is a view looking at the front of the mounting; and

Figure 7 is a side elevation, partly in section, taken on the line 7—7 of Figure 6 looking in the direction of the arrows to show the connecting of the instruments to the mounting.

Similar characters of reference designate like parts throughout the different views of the drawings.

As stated, it is the object of the invention to provide an improved mounting for indicating instruments particularly adapted for the mounting of indicating instruments upon the instrument board of motor vehicles where they may be readily observed by the driver of the vehicle. Such instruments comprise a speedometer to indicate the rate of travel of the vehicle, mileage travelled each trip and total mileage travelled, an ammeter to indicate the condition of the electrical means, an oil gauge to indicate the condition of the oil feeding system, and a gauge to indicate the quantity of gasolene in the gasolene storage tank, all of which instruments have an individual mounting upon different parts of the instrument board with the result that some are out of the range of vision of the driver in normal driving position, and in the embodiment of the invention as illustrated in the drawings there is provided a single unitary mounting for such instruments whereby the instruments are supported upon the instrument board in a compact manner and taking up a minimum amount of space.

In carrying out the invention I provide a plate 8 arranged with a perforation 9 of circular shape and openings 10, 11 and 12 of rectangular shape although they may be of any desired conformation. These perforations are formed by stamping portions of the material from the plate and then flanging or bending such material to extend laterally from one face of the plate, to constitute the rear of the plate, as shown at 13. The opening 9 is adapted for the mounting of a speedometer of the usual circular form, indicated in a general way at S in Figure 7, with the indicia of the indicating mechanism of said instrument exposed through the opening 9. The speedometer is mounted upon the plate by engaging the open end of the speedometer casing upon the flange 13 about said opening and releasably securing the same thereto, shown in the present instance as by set screws and threaded into the flange.

The ammeter, gasolene indicating gauge and oil pressure gauge may be of any suitable construction and arrangement employing a pivotally supported indicator dial in the form of a wheel arranged with calibrations upon the periphery thereof, as shown in a general way at D in Figure 7 and the operative mechanism of such indicator instruments mounted in suitable casings, such instrument carrying casings in the present instance being shown of rectangular shape and indicated by 15, 16 and 17, respectively, said casings being open at one end and at which ends they are mounted upon the plate in relation to the openings 10, 11 and 12 with the peripheral portions of the indicator dials or wheels exposed through said openings. To mount said instrument carrying casings upon the plate 8 the open end is engaged over the flanges 13, and to releasably though rigidly secure the casings in position upon said flanges, the flanges are arranged with resilient tongues 18 sprung slightly outward from the flanges, the tongues being preferably arranged intermediate the ends of the flanges as clearly shown, and the end of the tongues provided with a catch or lip to engage in perforations in the casings, as shown at 19 in Figures 2 and 7. In mounting the instrument casings upon the plate 8 it will be obvious that by pushing the casings onto the opening flanges 13 the tongues will be moved inward against their inherent tension, and the openings in the casings for the engagement of the tongue lips are so arranged that when the open end of the casings is contiguous to the plate the openings for the tongues will be in position for engagement by said tongue lips which will be automatically engaged therein. It will also be obvious that by exerting a pull upon the casings in a direction away from the plate that the instruments may be readily dismounted from the plate. To dismount the instruments, if desired certain of the tongues may be sprung to disengage the tongue lips from the casing perforations when the instrument casing is removed by tilting the same laterally. The tongue lips are arranged with a right angle inner shoulder and as said shoulder engages the wall of the casing opening it will hold the casing firmly supported upon the opening flanges 13.

A dial plate 20 (Figures 4 and 4$^a$) is juxtaposed to the face of the plate 8 opposite to the face at which the instrument carrying casings are mounted, said dial plate being arranged with openings 9$^a$, 9$^b$ and 9$^c$ and a perforation for a setting pawl for the trip indicator of the speedometer, as shown at 21. These openings are arranged relative to the opening 9 and are adapted for the exposing of the digits of the indicating mechanism of the speedometer with suitable indicia arranged adjacent to said openings, as shown in Figures 4 and 6. The dial plate is also arranged with openings 10', 11' and 12' arranged to register substantially centrally between the ends of the openings 10, 11 and 12 To position the dial plate relative to the plate 8 with the openings in proper register and to secure the plates together the dial is arranged with tangs 22 adapted to be engaged in notches 23 arranged in the edge of the mounting plate 8 and bent against the back of said plate. The marginal portions of the openings in the dial plate are flanged laterally as at 24. The upper and lower flanges of the openings 9$^a$, 10', 11' and 12' are curved to conform to the curvature of the indicator wheels of the indicating instruments and to lie contiguous thereto, the opposite end flanges also being arranged to lie contiguous to the indicator wheels as clearly shown in Figure 7. The marginal portion of the openings 9$^b$ and 9$^c$ are similarly flanged but with the end extending parallel with the plate. This arrangement of the openings forms what is in the nature of a frame which facilitates the reading of the indices of the indicator wheels exposed through the openings.

To provide a closure for the openings in the dial and mounting plates and the open end of the instrument carrying casings a plate 25 of transparent material, preferably glass, is juxtaposed to the dial plate and combined with the dial and mounting plates by a bezel 26 or frame of channel shape in cross section, as shown in Figure 5. This bezel is formed of angle shape in cross section, one angle portion being engaged at the front of the transparent plate and arranged with an outwardly extending bead, as at 27, to not only serve as an ornamentation but which also serves to carry a cushioning material interposed between the bezel and transparent plate when the latter is made of glass. The bezel in this condition is applied to the face of the transparent plate when the other angle portion is bent against the rear of the mounting plate 8 thereby binding the plates 8, 20 and 25 into an integral structure, as shown in Figure 2. In practice the plates are assembled in the bezel 26 when the instrument carrying casings are mounted upon the supporting flanges about the openings in the mounting plate. The plates 8, 20 and 25 are of a size to extend laterally of the instrument carrying casings and whereby the instrument mounting is adapted to be mounted and secured in position by suitable means in an opening in the instrument board of a motor vehicle or the like.

The speedometer may be of any commercial form and the openings in the dial plate arranged to expose the indicating digits. However, the indicating instruments 15, 16 and 17 are of a form utilizing a pivotally supported or rotatable indicating dial having indices arranged on the periphery, the ammeter and the gasolene gauge are preferably of the type disclosed in my co-pending application Serial No. 723,241, and the oil pressure gauge preferably being of a type as disclosed in my co-pending application Serial No. 5,110 to which applications reference may be had.

While the instruments 15, 16 and 17 have been described as comprising an ammeter, and oil and gasolene gauges, it will be obvious that other indicating instruments may be substituted therefor, such as gauges for indicating the quantity of oil in the crank case of the engine of a motor vehicle, the quantity of cooling liquid in the radiator of the temperature of such cooling liquid, or combination instruments of this character as disclosed in my said co-pending application Serial No. 723,241.

It will also be obvious that various modifications may be made in the construction and arrangement of parts and portions of the invention used without others and come within the scope of the invention.

Having thus described my invention, I claim:

1. In a mounting for indicating instruments, a plate having a portion stamped therefrom to form an opening in the plate with the material stamped from the plate to form the opening flanged laterally to extend in angular relation to the back of the plate to serve as attachment and supporting means for an instrument carrying casing, and a dial plate juxtaposed to the face of the first plate arranged with an indicator opening of less area than the opening in the first plate and arranged centrally of the opening in said first plate with the marginal portion of the opening flanged laterally in a direction to extend through the opening in the first plate and the flanged portions converging toward each other.

2. In a mounting for indicating instruments, a plate having a portion stamped therefrom to form an opening in the plate with the material stamped from the plate to form the opening flanged laterally to extend in angular relation to the back of the plate to serve as attachment and supporting means for an instrument carrying casing, a dial plate juxtaposed to the face of the first plate having an indicator opening of less area than the opening in the first plate adapted to register centrally of the opening in said first plate with the marginal portion of the opening flanged laterally in a direction to extend through the opening in the first plate, a plate of transparent material juxtaposed to the dial plate, and means engaged about the marginal portions of the plates to unite the instrument mounting dial and transparent plates in juxtaposed relation to each other.

3. In a mounting for indicating instruments, a plate having a portion stamped therefrom to form an opening in the plate with the material stamped from the plate to form the opening flanged laterally to extend in angular relation to the back of the plate to serve as attachment and supporting means for an instrument carrying casing, a dial plate juxtaposed to the face of the first plate having an indicator opening of less area than the opening in the first plate and adapted to register centrally of the opening in said first plate, with the marginal portion of the opening flanged laterally in a direction to extend through the opening in the first plate and the flanged portions converging toward each other, a plate of transparent material juxtaposed to the dial plate, and a bezel to extend about the margin of the juxtaposed plates with a part to engage at the front of the transparent plate and a part to engage at the back of the instrument supporting plate to unite the plates into a unitary structure.

4. In a mounting for indicating instruments, a plate having a portion stamped therefrom to form an opening in the plate with the material stamped from the plate to form the opening flanged laterally to extend in angular relation to the back of the plate to serve as attachment and supporting means for an instrument carrying casing, a dial plate having an opening with the marginal portion of the opening flanged laterally in a direction to extend through the opening in the first plate and the flanged portions converging toward each other and said plate arranged with tongues at the marginal portion for engagement with the recesses in the edge of the supporting plate to position and connect the dial plate and the supporting plate with the openings in the plates in register.

5. A mounting for indicating instruments as claimed in claim 4, wherein the flange about the opening in the mounting plate is arranged with laterally flexed resilient tongues to serve as the means to secure an instrument casing upon the instrument supporting flange of the plate.

6. A mounting for indicating instruments as claimed in claim 4, wherein the mounting and dial plates are arranged with a series of openings for the mounting of a series of instruments thereon.

7. A mounting for indicating instruments as claimed in claim 4, wherein the mounting plate is arranged with a series of openings for the mounting of a series of instruments thereon, and the dial plate has a series of openings certain of which openings register with one opening in the mounting plate and the series of the dial openings register with another opening in the mounting plate.

8. A mounting for indicating instruments comprising a plate having portions stamped therefrom to form an opening in the plate and the stamped portions bent laterally to form a flange about the opening for the mounting and supporting of an indicating instrument from the plate, and resilient tongues formed from said flanges and flexed laterally thereof to co-operate with the casing of the indicating instrument mounted thereon to rigidly and releasably secure the indicating instrument upon the mounting flanges.

Signed at New York city, in the county of New York and State of New York, this 14th day of January, 1925.

MERION J. HUGGINS.